United States Patent

Sanders

[15] 3,680,089
[45] July 25, 1972

[54] AIRCRAFT ELECTRONIC LANDING RESPONSER SYSTEM USING AIRBORNE CHIRP INTERROGATION

[72] Inventor: Lon L. Sanders, Rolling Hills, Calif.
[73] Assignee: International Telephone and Telegraph Corporation, New York, N.Y.
[22] Filed: March 30, 1970
[21] Appl. No.: 23,869

[52] U.S. Cl............................343/6.5 R, 343/5 LS, 343/11 R, 343/16 R, 343/17.2 R
[51] Int. Cl............................................G01s 9/56, G01s 9/23
[58] Field of Search....................343/5 LS, 6.5 R, 11 R, 16 R, 343/17.2 R

[56] References Cited

UNITED STATES PATENTS 3,266,038   8/1966   Milne et al. .........................343/11 R

*Primary Examiner*—T. H. Tubbesing
*Attorney*—C. Cornell Remsen, Jr., Walter J. Baum, Paul W. Hemminger, Charles L. Johnson, Jr. and Thomas E. Kristofferson

[57] ABSTRACT

An instrument landing system particularly adapted for VTOL aircraft, including an airborne chirp pulsed interrogator. A ground station antenna has the characteristic of directively transmitting and receiving at a beam angle which is a function of frequency.

The ground station also includes a power amplifier and RF hybriding apparatus, so that the ground station can perform as a selective amplifying reflector or phase coherent repeater. Reradiated energy from the ground station is then at the same angle as reception. The reradiated frequency is compared with the airborne chirp frequency (as it correlates with ground station antenna beam angle) to obtain an air-derived approach angle.

Range is determined in the air by correlating reradiated frequency with chirp frequency as it relates to time delay (round trip transmission time).

The ground antenna beam is relatively broad in the plane orthogonal to the plane of angle measurement.

10 Claims, 1 Drawing Figure

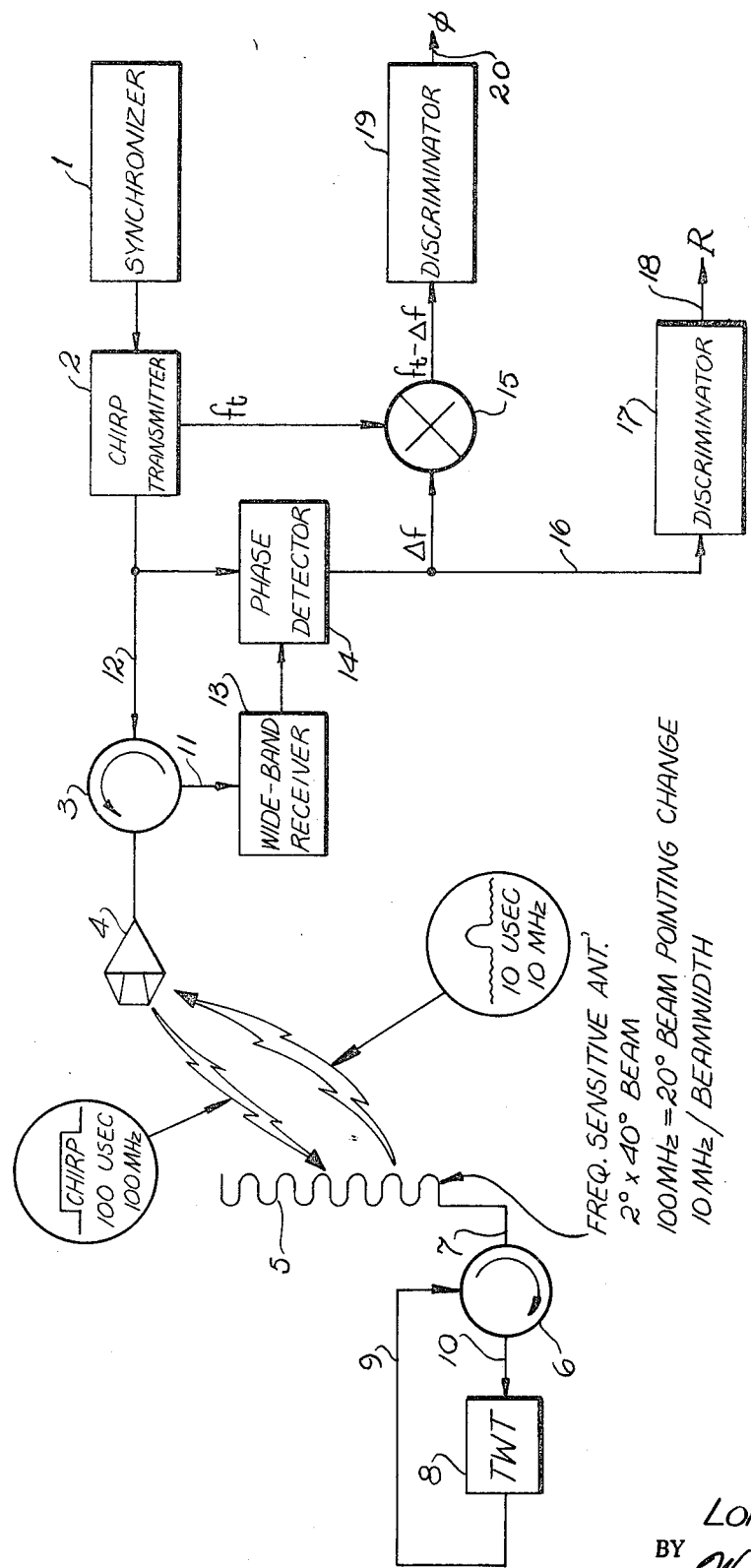

AIRCRAFT ELECTRONIC LANDING RESPONSER SYSTEM USING AIRBORNE CHIRP INTERROGATION

BACKGROUND OF THE INVENTION

1. Field of The Invention

The invention relates broadly to air navigation systems and more particularly to instrument landing systems for obtaining air-derived range and angle information.

2. Description of The Prior Art

In the prior art there have been many developments to provide navigational guidance to aircraft. Such systems have been produced for long-range or enroute navigation (LORAN, Omnirange, Radar in various forms, etc.), as well as for the relatively more critical problem of providing navigational assistance under low visibility instrument conditions at the time of landing. The urgency of the landing situation has long been recognized as a problem of very high priority, since it critically affects safety and continuity of operation in civil and military aviation.

Existing systems for landing includes ILS, GCA, Automatic GCA, and various other active ground and airborne radar systems. A comprehensive reference for reader background which describes most of the better known prior art navigational aids for aviation is the textbook "Electronic Avigation Engineering" by P. C. Sandretto, published in 1958 by International Telephone and Telegraph Corporation, New York, New York.

One embodiment of the so-called GCA system is described in U.S. Pat. No. 2,975,413 and in its automatic track-while-scan form is typically covered in U.S. Pat. No. 2,980,902.

Various ways have been proposed for using radar for specialized landing assist, however, the relative complication and operating personnel requirements can be seriously disadvantageous in the case of the remote or newly established landing area for aircraft of the VTOL classes. Landing aids for VTOL aircraft in all-weather conditions are of special interest in certain military situations, and are attracting increasing interest in other situations.

In the particular type of device with which the present invention is concerned, a few specific applications are as follows:

a. A landing aid for VTOL fighter/bomber aircraft for use at remote dispersal airfields or parking pads.
b. A landing aid for assault helicopter operations in remote areas previously accessible only by parachute.
c. A landing aid for civil helicopter and VTOL airways operations for use in urban areas.
d. A landing aid for forward area Army airfields or cargo delivery air strips.
e. A landing aid which augments an ILS system or a GCA system at larger well-improved airports.

The above areas of need represent situations where there is a high premium on all weather operations and a large number of potential user aircrafts. None of the above requirements can be effectively satisfied by the existing ILS or GCA type systems.

SUMMARY OF THE INVENTION

In accordance with the requirements hereinbefore outlined and in view of the nature of existing electronic landing aid equipment, it may be said to be the general object of the present invention to implement a landing aid system providing for air-derived angle and range information.

In the configuration of the present system, emphasis has been placed on the use of advanced technology to produce a system which has substantially better capabilities in terms of aircraft control, data rate, accuracy, equipment complexity, weight and reliability, than was previously available in the prior art.

In the system of the present invention the ground station is quiescent except when interrogated. It is also not substantially limited in the number of interrogations accepted or replies delivered, and therefore, a plurality of approaching aircraft can make use of the ground equipment contemporaneously. Transmission paths between the aircraft and land station or vice versa are strictly one-way transmissions, requiring only modest levels of transmitted power. The ground station plays back in a unique manner not duty cycle limited. It is also not possible for the ground responser to be captured by one interrogator and made "deaf" to others, as can be the case with certain transponder devices.

The system of the present invention may be briefly summarized as follows:

An airborne transmitter sends frequency modulated (chirp) pulses as interrogation signals toward a ground station. The ground station is adjacent to the landing area and comprises an antenna array which forms its transmitting (and receiving) beam at an angle in the plane of measurement, which angle is a function of frequency. The ground antenna pattern in the orthogonal plane is a fan in order to account for elevation variations if the angle of measurement is in azimuth and vice versa.

The chirp limits are equivalent to the maximum and minimum beam angles of interest (ground station antenna). Energy received at said ground station is power amplified and contemporaneously reradiated at the same angle. The frequency sensitive antenna thus acts as a frequency filter in both directions. The airborne package contains the instrumentation necessary to determine the angle to be measured in a discriminator calibrated consistent with the ground antenna. Range is measured by effectively converting the reradiated frequency burst to time measured from the beginning of the chirp pulse, since the variation of frequency within the chirp pulse is predetermined and therefore relatable to range as a function of time elapsed between the chirp pulse initiation and the reception of the reradiated burst at the aircraft.

BRIEF DESCRIPTION OF THE DRAWINGS

The FIGURE is a complete functional block diagram of the system of the present invention.

DESCRIPTION OF THE PREFERRED EMBODIMENT

Referring now to the FIGURE, there is illustrated a complete block diagram depicting the structure of the present invention. The exchange of signals between the airborne antenna 4 and the ground antenna array 5 is illustrated symbolically and will be discussed in detail as this discussion proceeds. Those components and elements of the structure illustrated including antenna 4 and all elements to the right of it on the FIGURE are to be understood to comprise the airborne equipment. The ground station which is normally located adjacent to the landing area comprises the antenna array 5, the traveling-wave tube amplifier 8 and the circulator 6.

As has been pointed out, the ground antenna array 5 is one which radiates a relatively narrow beam in one plane at an angle which is a function of its frequency of excitation. For purposes of the present description, it will be assumed that the beam formed by antenna array 5 is narrow and controllable as a function of frequency in the elevation plane. That is to say, it is oriented to make an elevation measurement. The present system is equally well adapted to the measurement of azimuth angles, however, for purposes of simplicity, the description hereinafter assumes that the angle of measurement interest is the vertical angle, i.e., the angle measured vertically from the plane of the horizon to the aircraft.

The airborne components of the system begin at the synchronizer 1 which operates as a timing pulse generator and transmitter pulse modulator in a manner well understood in this art. The PRF (pulse repetition frequency) of synchronizer 1 is comparatively low, that is, in one practical case 250 Hz. Selection of PRF and transmitter pulse duration are influenced by the fact that the system depends upon reception of reply or reradiated information from the ground station during the time that the transmitter is still operating, i.e., during the chirp pulse. The chirp (FM pulsed) transmitter transmits a frequency modulated pulse 100 microseconds in duration, at the PRF determined in the synchronizer 1, as aforesaid. The said chirp of the transmitted pulse covers a frequency band 100 mHz in width over the same frequencies during each 100 microsecond pulse. The basic transmitter frequency is selected within an appropriate microwave band. Although the invention is not limited as to the basic transmitting frequency of the chirp transmitter, nevertheless, practical considerations, such as the size of the ground antenna, etc., dictate preferred operation in the general region of 5,000 to 15,000 mHz.

Each successive transmitter pulse, being frequency modulated in the same way an established relationship of transmitted frequency directly calibrated to the ground station antenna 5 is maintained. Stated otherwise, it may be said that the ground antenna 5 is designed to operate over the range of chirp, the 100 mHz frequency modulation corresponding to the full range of angles of its beam in the elevation plane through the total angle of interest, i.e., over angular extremities ranging from barely over the horizon up to 20° nominally.

It will be realized at this point that, as the said chirp transmitter sweeps through the prescribed frequency band, and so long as the airborne antenna 4 energizes the general area of the ground station antenna 5, there will be a frequency within this sweep which corresponds to the frequency at which the ground station antenna 5 is capable of transmitting and receiving. That particular frequency of response is a function of the said elevation angle to be measured (angle of the aircraft carrying the airborne components).

The ground station antenna 5, while it has the aforementioned frequency sensitive characteristic in the elevation plane, is designed to have a relatively broad fan beam in the orthogonal or azimuth plane in this case. Accordingly, the vertical measurement is capable of being performed over a substantial range of azimuth angles. One suitable antenna configuration for the ground station location is described in U.S. Pat. No. 3,039,097. In that patent, a long highly dispersive waveguide transmission line is folded into a serpentine shape, in order that the path between adjacent radiators tapped into this waveguide transmission line may be designed to a predetermined ratio of electrical path length within the waveguide to the radiator spacing in external space. By controlling this parameter, the desired angular sensitivity as a function of frequency may be achieved. The longer the serpentine path within the waveguide, between adjacent radiators, the greater will be the phase change at the successive radiators as a function of frequency, and therefor, the greater the beam angle change per increment of frequency change. The said U.S. Pat. No. 3,039,097 obtains a suitable fan pattern in the orthogonal mode through the use of a reflector, however, a two-dimensional planar array is also possible for obtaining the desired orthogonal beam shape.

Two circulators 3 and 6 are used in the system. The airborne circulator 3 is designed to pass transmitter chirp pulses arriving on lead 12 through to the airborne antenna 4 with substantially no diversion of energy along the lead 11 to the wideband receiver. Energy reradiated from the ground and received at airborne antenna 4 is, on the other hand, passed by the circulator 3 to the lead 11 and into the wideband receiver 13 without diversion of any substantial portion of this received energy toward the lead 12.

At the ground station, the circulator 6 performs a very similar function. Energy received from the airborne antenna 4, entering the ground station antenna 5 is passed by the circulator 6 from lead 7 to lead 10 and thence into the travelling-wave tube amplifier 8. The output of the said travelling-wave tube passes via lead 9 into the other input port of the circulator 6. Energy entering the circulator at 7 passes almost entirely to lead 10 and energy entering the circulator via lead 9 passes almost entirely back to the ground station antenna 5 via lead 7 for reradiation. The use of a travelling-wave tube in this particular application is typical. Actually, such a device provides a particularly convenient broadband amplifier for this application although any other type of radio frequency power amplifier affording the necessary bandwidth (to accommodate the full FM range of chirp transmitter 2) could be used.

From the foregoing it will be understood that the ground station acts as a selective transponder or responsor. The energy reradiated toward the airborne antenna 4 is directed at the same elevation angle at which the selected interrogation frequency is received at antenna 5. Thus, the antenna 5 may be characterized as a type of selective filter operative in two directions.

The elevation plane beam width radiated from the antenna 5, being approximately 2° in a typical embodiment, and the entire 100 mHz chirp range corresponding to a 20° total elevation beam pointing variation, it follows that the reply radiated by ground station antenna 5 is a pulse of fm spectrum approximately 10 microseconds in width and containing 10 mHz of the chirp frequency variation. This 10 mHz frequency variation corresponds to the product of the ratio of the vertical plane beamwidth of the antenna 5 as a fraction of the total useful angle of measurement from angle 5 (i.e., 20°) times the total transmitted chirp of 100 mHz.

The degree of complication, size, weight, and power requirements of the ground station equipment will be seen to be minimal. Moreover, it is not duty cycle limited as is the case with some beacon transponders. Thus the ground station is capable of providing replies in the same manner to a number of aircraft interrogating asynchronously at various angles approaching the said ground station within the relatively broad azimuth beam pattern of 5.

The details of construction of the circulators 3 and 6 are well known in this art. Circulators per se have been known in the microwave arts in 3 and 4 port versions. The present circulators may be classified as 3 port types and as such, have often been instrumented as what has been called ferrite circulators.

In accordance with the operation of the circulator 3, received energy will be passed from the circulator via lead 11 to the wideband receiver 13 while the chirp transmitter 2 is still operating, provided the time required for interrogation energy to traverse the distance from antenna 4 to antenna 5 and be reradiated back again to antenna 4 is not longer than the duration of the said chirp transmitter pulse. In the example given, in which the chirp pulse from the chirp transmitter 2 is 100 microseconds in duration, it will be seen that an approach distance of roughly 5 to 9 miles still provides time during which energy will be both transmitted and received at antenna 4.

It will be noted that, since the directive beam of the ground antenna is ten percent of its range of beam pointing angles, some approach to the problem of effectively locating the beam center is required if accurate angle determinations are to be made. This problem and the problem of range determination are handled in circuits not unlike those of CW radar altimeters described in "Introduction to Radar Systems", a text by Merrill I. Skolnik (McGraw Hill Book Co. 1962) at section 3.3, entitled "Frequency-Modulated CW Radar". The fact that the present system is pulsed and not an overall CW system does not fundamentally alter the angle and range measurement instrumentations.

In the figure, a phase detector 14 compares the output of the wideband receiver with a reference signal taken from the chirped transmitter output. During the contemporaneous application of this reference and the received signal (which is an approximately 10 microsecond burst of frequency modulated signal) to the phase detector 14, an output from said phase detector $\Delta f$ is obtained. This signal is not unlike the output of phase detector in a coherent system, in that it contains the beat frequency as a bipolar signal which is applied to mixer 15 and to discriminator 17. This discriminator 17 has a response curve which is swept across by the varying signal $\Delta f$ applied at 16. The resulting output is averaged and delivered at 18 as the range analog signal R. The said discriminator curve is calibrated to the chirp function, which relates to time measured from the beginning of each chirped transmitter pulse. Normally, the said chirp function would be linear, that is $df/dt$ is constant throughout each transmitted pulse. However, it is not necessary that this be true as long as the function matches the discriminator curve and does not contain slope inflection points which would introduce ambiguities.

If the transmitted pulse chirp were upward in frequency (not a requirement) the greatest range would result from the received pulse most delayed and therefore occurring when the transmitted pulse frequency into phase detector 14 was greatest, producing an R value at 18 which would be at one extreme of the possible outputs of 17. The converse is obviously also true.

In angle measurement, the same $\Delta f$ signal and a reference $f_t$ (which is the frequency modulation signal from the chirp transmitter without the carrier) are applied to mixer 15 to produce $f_t - \Delta f$. This signal is applied to an angle discriminator 19 which effectively measures the average frequency of the reradiated frequency burst received from the ground station. This discriminator 19 is calibrated to the frequency versus angle function of ground antenna 5, so that the $\phi$ angle output analog at 20 is a direct function of the angle of the aircraft above the horizon as seen from the ground station. Here again linearity of the function is not required. In fact, the angle versus frequency function in an antenna such as 5 is inherently non-linear and therefore, a correspondingly non-linear discriminator curve is required for 19.

It will be understood by those skilled in this art that there are various ways of decoding or extracting angle and range information in the airborne circuits, once the nature of the information content of the interrogating chirp pulses and the reradiated signals received at antenna 4 is understood from this description.

Various other modifications are also possible within the spirit of the invention, which is not to be considered limited by the drawing or description. The drawing and description are illustrative only.

What is claimed is:

1. An air navigation system particularly adapted for instrument landing of VTOL aircraft, comprising the combination of:
   first airborne means including means for generating and transmitting a series of frequency modulated transmitter pulses of duration short compared to the repetition period of said pulses but long compared to the two-way transmission time to an intended landing point, toward said landing point;
   a ground responser station located adjacent said landing point, said ground station including a directive antenna for receiving and transmitting a beam of electromagnetic energy at an angle in a plane which is a function of frequency, and means cooperating with said antenna to cause amplified reradiation of received energy at the angle of reception substantially during the time of said reception;
   second airborne means for receiving said reradiation during at least a portion of the time of said transmitter pulses, including first discriminator means for comparing the frequency of the energy of said reradiation with the instantaneous frequency of said frequency modulated transmitter pulses at the time of reception of said reradiation at said airborne means to determine the elevation angle of said aircraft measured from said ground station.

2. The invention set forth in claim 1 in which said discriminator means is defined as being calibrated in terms of angle of radiation and reception by said ground station antenna versus frequency.

3. The invention defined in claim 2 in which said transmitter pulse frequency modulation and the angle of said ground antenna radiation as a function of frequency vary in a continuous smooth manner having no change of slope sense during measurement operation, and second discriminator means responsive to said reradiation received at said aircraft are included for producing a signal which is the analog of range from said aircraft to said ground station, said second discriminator means being calibrated in terms of time versus frequency, thereby to provide first and second analog signals representative of elevation angle and range respectively, of said aircraft with respect to said ground station.

4. The invention set forth in claim 3 in which said frequency modulation is defined as varying linearly as a function of time over the duration of said transmitter pulses, and said second discriminator means produces said second analog signal as a linear function of frequency.

5. The invention set forth in claim 1, further defined in that range computing means responsive to said reradiated energy are included for producing a signal which is the analog of range from said aircraft to said ground station, said range computing means being calibrated to produce an output proportional to the time from the start of each of said transmitter pulses as a function of said frequency modulation.

6. Apparatus according to claim 1, in which said ground station antenna contains at least one dispersive multi-element linear array oriented to form a narrow beam in at least the angular coordinate to be measured, said beam being formed at an angle in the same coordinate which is a function of frequency, and including a radio frequency power amplifier connected to receive said frequency modulated transmitter pulses through said antenna, and first hybrid means connected between the input and output of said power amplifier and to said antenna for directing energy received by said ground station antenna to the input of said power amplifier and simultaneously from the output of said power amplifier to said antenna for reradiation.

7. Apparatus according to claim 6 in which said power amplifier is a travelling wave tube.

8. Apparatus according to claim 6 in which said first and second airborne means comprise:
   an airborne antenna;
   a receiver capable of passing all frequencies reradiated from said ground station corresponding to measurement angles of interest;
   a second hybrid connected between said means for generating transmitter pulses and said receiver and to said airborne antenna, for passing said reradiated energy received by said airborne antenna to said receiver while simultaneously passing energy from said means for generating transmitter pulses to said airborne antenna;
   and angle detecting means responsive to said transmitter pulses and the output of said receiver for producing an angle representing signal having a frequency which is a function of said receiver output;
   and means for applying said angle representing signal to said first discriminator means to produce a signal which is the analog of elevation angle.

9. Apparatus according to claim 8 in which said second airborne means includes a phase detector circuit responsive to the output of said receiver and said transmitter to produce a range representing signal having a frequency which is a function of the difference between said transmitter and receiver output frequencies;
   and including a second discriminator, calibratable in terms of range, responsive to said range representing signal for producing an output signal which is the analog of range.

10. Apparatus according to claim 6 in which said first and second airborne means comprise:
   a frequency modulated pulse transmitter, a receiver, an airborne antenna and a duplexer interconnected for contemporaneously transmitting said frequency modulated pulses and receiving said reradiated energy from said ground station;
   a phase detector responsive to the output of said receiver and said transmitter to provide an output $\Delta f$ including the beat frequency of said transmitter and receiver outputs;
   a mixer responsive to the frequency modulation signal $f_t$ component present in said transmitter without the RF carrier of said transmitter and to said $\Delta f$ signal for providing the mixer output $f_t - \Delta_t$;
   means comprising said first discriminator circuit responsive to said $f_t - \Delta_t$ signal to produce an output angle analog signal;

and means comprising a second discriminator circuit responsive to said Δ*f* signal to produce an output range analog signal.

* * * * *